United States Patent Office 3,349,142
Patented Oct. 24, 1967

3,349,142
PROCESS FOR THE PREPARATION OF
ALKYLATED DI-p-XYLYLENES
Ying L. Yeh, Highland Park, N.J., assignor to Union
Carbide Corporation, a corporation of New York
No Drawing. Filed Dec. 31, 1964, Ser. No. 422,493
3 Claims. (Cl. 260—671)

This invention relates to a process for the preparation of alkylated di-p-xylylenes.

Although the preparation of alkylated di-p-xylylenes is known the reactions therefore have generally produced mixtures of various alkylated di-p-xylylenes which must then be separated by distillation or other means. In addition, such reactions have produced methyl di-p-xylylene in but low yields and have thus not been commercially desirable as a preparation thereof. For example, in the direct methylation of di-p-xylylene by a methyl halide in the presence of aluminum chloride, only low yields of methylated di-p-xylylene have been obtained presumably due to the known low reactivity of methyl halides. There has thus heretofore been no process available which has been suitable for the preparation of methyl di-p-xylylene in high yields as well as for the higher alkylated di-p-xylylenes.

Accordingly, it is an object of this invention to provide a process for the preparation of alkylated di-p-xylylenes, including methyl di-p-xylylenes, in high yields which are needed for the preparation of useful polymers therefrom.

According to the present invention it has been found that alkylated di-p-xylylene characterized by the formula:

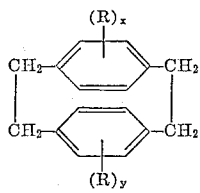

(I)

wherein R is a member selected from the group consisting of alkyl having from 1 to 8 carbon atoms and bromine, $x$ is an integer having a value from 1 to 3 inclusive and $y$ is an integer having a value from 0 to 3 inclusive, with the proviso that at least one R is an alkyl, can be prepared by the reaction comprising contacting brominated di-p-xylylene represented by the formula:

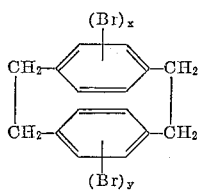

(II)

where $x$ and $y$ have the values indicated above, with a lithium alkyl in the presence of an inert organic liquid solvent for the brominated di-p-xylylene under anhydrous conditions at a temperature between about 0° C. and 90° C., the lithium alkyl being used in amounts sufficient to replace at least one bromine atom substituent on the di-p-xylylene with the corresponding number of lithium atoms. Thereafter the lithium substituted di-p-xylylene is contacted with a dialkyl sulfate to replace each lithium substituent with an alkyl group and form the corresponding alkylated di-p-xylylene.

Employing the above defined process wherein a brominated di-p-xylylene is contacted with a lithium alkyl at temperatures between about 0° C. to 60° C., bromo alkyl di-p-xylylenes are prepared which can be represented by the formula:

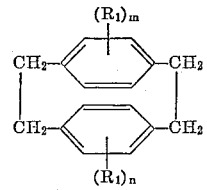

wherein $R_1$ is a member selected from the group consisting of an alkyl having from 1 to 8 carbon atoms and bromine, and $m$ and $n$ are integers such that $m+n$ can vary from 2 to 6 with the proviso that at least one $R_1$ is an alkyl and at least one $R_1$ is bromine, a novel composition of matter. Such composition includes monobromo monomethyl di-p-xylylene represented by the formula:

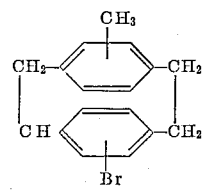

monobromo monoethyl di-p-xylylene represented by the formula:

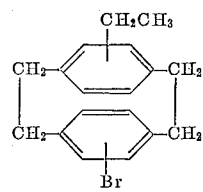

as well as the higher alkylated bromo di-p-xylylenes.

The brominated starting material can be conveniently prepared by contacting the cyclic dimer, di-p-xylylene, with free bromine in the presence of a Friedel-Crafts catalyst, such as the halides of boron, aluminum, zinc, iron, titanium, and tin and preferably the bromides of such metals. If desired, and as a convenient technique, it is possible to prepare the catalyst in situ during the reaction by the use of the free metal. For example, the use of catalytic quantities of iron powder, in a mixture of the di-p-xylylene and the free bromine, will react to form ferric bromide which serves as the catalyst in the reaction. Equivalent results can be secured however, by using ferric bromide or other Friedel-Crafts catalyst initially.

The reaction is most conveniently conducted in an inert organic diluent such as carbon tetrachloride, methylene chloride and like inert solvents which are themselves halogenated or which can be readily halogenated in the reaction, but which are inert to the di-p-xylylene and do not hinder or prevent the reaction. The use of bromine dissolved in the solvent selected for the reaction makes it easy to control the reaction and facilitates accurate determination of addition rates of the bromine.

While the reaction readily proceeds without need for additional heat, it is often desirable to hasten the reaction by mild heating, to as high as 80° C., although it is possible to conduct the reaction at temperatures as low as 0° C. if desired. After apparent reaction is terminated as evidenced by vapor phase chromatographic analysis of samples taken periodically during the addition of bromine to the reaction mixture or simply noting the acceptance of the stoichiometric proportions of bromine by the reaction system, the brominated products can be recovered, after filtering off the catalyst, by concentrating the reaction mass by distillation or other similar means and thereafter causing the crystallization or precipitation of the brominated di-p-xylylene by cooling of the reaction medium. The brominated product can be readily recovered by filtration and purified by sublimation.

By careful conrol of the amount of bromine added, the degree of bromination can be regulated to give brominated products in relatively pure form, and substantially free of large amounts of the other brominated products. For example, a mixture of mono bromo and dibromo di-p-xylylene can readily be separated due to the divergence of melting points, i.e. mono bromo di-p-xylylene having a melting point of 132°–134° C. and dibromo di-p-xylylene having a melting point of 245°–246° C. by such convenient means as fractional distillation.

In the process of the present invention, the brominated di-p-xylylene is contacted with the lithium alkyl in amounts basically corresponding to at least stoichiometric amounts, i.e., about one mole of lithium alkyl per mole atom of bromine on the di-p-xylylene. Preferably an excess of the lithium alkyl is employed, generally about 100 percent in excess of stoichiometric, although greater or lesser amounts can be employed if desired.

The particular lithium alkyl employed herein is not critical inasmuch as the lithium atom replaces the bromine atom or atoms on the di-p-xylylene, resulting in the formation of an alkyl bromide which is easily removed from the system if desired, or can otherwise remain in the reaction mass as an inert diluent. Because of ease of obtaining the lithium lower alkyls and their relative costs, it is preferred to employ the materials having up to about 10 carbon atoms in the alkyl moiety, such as methyl lithium, ethyl lithium, propyl lithium, n-butyl lithium, hexyl lithium, and the like.

These compounds can be employed with or without organic diluents. The commercially available lithium alkyls, generally marketed in aliphatic solvents such as pentane and hexane can be used in such form without need to remove the solvent.

It is desirable that the entire reaction of the brominated di-p-xylylene with the lithium alkyl be conducted in an inert organic solvent for the reactants and products, i.e. an organic liquid in which the brominated di-p-xylylene is completely soluble at the reaction temperatures and which is inert and unreactive toward it and the products prepared. It is not necessary however, that the brominated di-p-xylylene be soluble in the solvent media at room temperatures. Such solvents as aromatic hydrocarbons as, for example, benzene, toluene, naphthalene, and the like, cyclic and acyclic aliphatic ethers and similar solvents such as tetrahydrofuran, dioxane, aliphatic ethers such as diethyl ether, ethyl propyl ether, methyl butyl ether, allyl ethyl ether and the like are well suited for use as the inert solvent medium for this reaction. Preferably, the normal boiling points of these solvents are below 90° C. so that reflux conditions can conveniently be maintained if desired at atmospheric pressure. However, accurate temperature control can be maintained by other techniques as are obvious to those skilled in the art.

While the reaction is basically conducted without need for a catalyst, it is possible to employ a catalyst if desired. Copper powder, for example, is a suitable catalyst for this reaction.

There are no critical pressure limitations imposed on the reaction, for it will readily proceed at subatmospheric, atmospheric or superatmospheric pressures. However, inasmuch as the lithium alkyls readily hydrolyze in the presence of even atmospheric moisture, care must be exercised to provide for anhydrous solvents and that the surrounding atmosphere is inert and dry. Preferably an atmosphere of dry nitrogen is employed, although any other suitable dry gas which is inert under the reaction conditions can be employed. It has thus been found desirable and convenient to use atmospheric or slightly above atmospheric pressures with dry solvents having boiling points below 90° C. Thus, by the term "under anhydrous conditions" as employed herein, it is meant to employ solvents substantially free of moisture content and to employ a dry inert ambient atmosphere for the reaction.

The reaction of the lithium alkyl with the brominated di-p-xylylene for the preparation of the lithium intermediate compound can be suitably conducted in a temperature range of about 0° C. to 90° C. However, the above reaction is preferably conducted in a temperature range of from about 60° C. to 90° C. for ultimate preparation of alkyl di-p-xylylenes or from 0° C. to about 60° C. for ultimate preparation of bromo alkyl di-p-xylylene. At temperatures lower than 60° C., the reaction will generally not go to completion leaving bromine on the di-p-xylylene, while at temperatures lower than 0° C. the reaction proceeds slowly at uneconomical rates. At temperatures above 90° C. side reactions begin to interfere to give lower yields of the desired lithium di-p-xylylene and by-product formation complicating the recovery of the pure material.

The alkylation of the lithium intermediate compounds is not critical as to the conditions used. The reaction which is exothermic readily goes at room temperature without need for catalyst or heat. If desired, this reaction can be conducted at elevated temperatures, room temperatures, or below with suitable external cooling. A preferred mode of procedure is to adjust the temperature of the reaction mixture containing the lithium di-p-xylylene intermediate to about room temperature or below and then slowly adding the dialkyl sulfate thereto to deter excess heating of the reaction mixture beyond the temperature desired which can result in undesirable side reactions. Moderate boiling of the mixture however is permissible. It will be recognized the above reaction can also be conducted by adding the lithium di-p-xylylene to the dialkyl sulfates in the presence of the aforementioned inert solvents associated with the formation of the lithium di-p-xylylene. Suitatble temperature control can be readily applied by the skilled practitioner.

The sulfate employed can be any dialkyl sulfate including dimethyl sulfate, diethyl sulfate as well as the higher alkyl sulfates known in the art having, for example, up to 8 carbon atoms or more in each alkyl radical.

The alkyl substitution reaction proceeds entirely on a stoichiometric basis with an alkyl radical replacing a lithium substituent on the di-p-xylylene in a 1 to 1 molar ratio and the released lithium combining with the residual sulfate ion to form a lithium salt. To insure substantially complete reactions, an excess amount of dialkyl sulfates is preferably employed.

Dialkyl sulfate in liquid form is contacted with the lithium di-p-xylylene in inert organic solvent as indicated above and alkyl di-p-xylylene is formed. Of course, where bromo lithium di-p-xylylene is contacted with the alkyl sulfate, bromo alkyl di-p-xylylene is formed. The alkylated di-p-xylylene product can be separated and recovered from the above solution by conventional means such as by adding water thereto to extract substantially all of the residual starting materials and by-products therefrom and separating the thus formed organic layer from the aqueous layer and repeating this sequence if desired until satisfactory extraction is obtained. The organic layer is filtered to remove residual particles such as copper catalyst and then concentrated to dryness by moderate heating at atmospheric or reduced pressures for example, 20 to 30 mm. Hg to obtain the solid alkylated di-p-xylylene. Any traces of dialkyl sulfate can be removed from the residual solid by drying the solid in high vacuo, about .05 mm. Hg at room temperature. The solid may additionally be recrystallized in alcohol, for example, methanol to assure high purity yields thereof.

Compounds prepared by this technique include dimethyl di-p-xylylene represented by the formula:

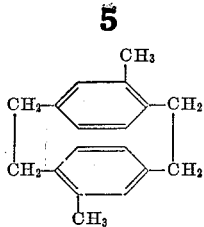

and having a melting point of about 182° C. to 183° C.

A further compound produced by the described technique is di-ethyl di-p-xylylene represented by the formula:

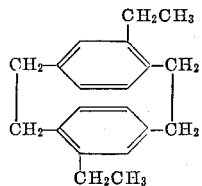

having a melting point of about 152° C. to 153° C.

These compounds when pyrolyzed at elevated temperatures have been found to yield stable various reactive diradicals having the structure:

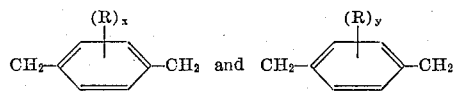

where R, $x$ and $y$ are as defined above and R can occupy any of the available positions on the aromatic nuclei. In the pyrolysis of these compound one mole of the dimer will produce one mole of each diradical as shown. These radicals will either be identical where, dimethyl di-p-xylylene is pyrolyzed or different where, for example, mono bromo mono methyl di-p-xylylene is pyrolyzed.

These reactive diradicals are quite stable in the gaseous state at temperatures above 200° C. but when cooled to their condensation temperatures, generally below 200° C., polymerization occurs.

Where the reactive diradicals are the same a homopolymer is obtained on condensation, represented by the repeating unit:

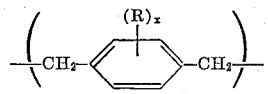

where R and $x$ have the indicated values. Where the reactive diradicals differ a random copolymer is obtained on condensation, having the repeating units:

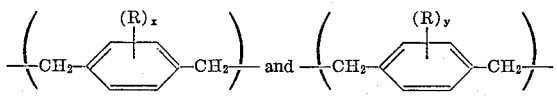

where R, $x$ and $y$ are as defined above. The product thus formed whether homopolymer or copolymer is a tough, high melting and solvent resisting polymer.

Pyrolytic polymerization of dimethyl-di-p-xylylene for example, by the above technique gave methyl parylene, a tough, transparent film. Methyl parylene was found to possess excellent properties. The approximate physical properties are as follows:

| | |
|---|---|
| Tensile modulus _____ p.s.i__ | 400,000 |
| Tensile strength _____ p.s.i__ | 9,500 |
| Elongation _____ percent__ | 230 |
| Glass transition temperature _____ ° C__ | 50–60 |
| Softening temperature _____ ° C__ | 200–210 |

Where different diradicals having different vapor pressures and condensation temperature ranges are present in the pyrolyzed mixture, homopolymers can result when a condensation and polymerization temperature is selected that is within the condensation range of but one of the diradicals. Thus, one diradical can be condensed and polymerized in one polymerization zone and another can be passed through the zone in vaporous form to be condensed and polymerized in a subsequent polymerization zone. Of course, copolymers result when the condensation temperature employed is within the condensation range of at least two diradicals.

In this process, the reactive diradicals are prepared by pyrolyzing the alkyl di-para-xylylene at a temperature less than about 700° C. and preferably at a temperature between about 550° C. to about 600° C. At such temperatures, essentially quantitative yields of the reactive diradical are secured. Operation below this temperature range, for example, at 450° C. to 550° C. serves only to increase the time of reaction and lessen the yield of polymer secured. At temperatures above about 700° C. cleavage of the substituent group can occur, resulting in a tri- or poly-functional species causing crosslinking or highly branched polymers.

The following examples are illustrative of this invention but are not intended to serve as any limitation or restriction thereof. All percentages and parts are by weight.

EXAMPLE I

*Preparation of di-methyl di-p-xylylene*

A mixture consisting of 5 grams of di-p-xylylene, 0.1 gram of iron powder and 400 ml. of carbon tetrachloride was placed in a 500 ml., 3 neck flask, equipped with a reflux condenser, stirrer and addition funnel. A solution of 10 grams of bromine in 50 ml. of carbon tetrachloride was added dropwise from this addition funnel to the stirred suspension over a 30 minute period. The reaction mixture was stirred at 10° C. to 20° C. for 12 hours. The catalyst was filtered off, and the solution concentrated to 30 ml. by distillation. Upon cooling, dibromo-di-p-xylylene crystallized from solution. The material was separated by filtration, and purified by sublimation. A total of 3.3 grams (equivalent to 37 percent yield) was obtained. The material had a melting point of 240° C. to 242° C. The material analyzed for 43.4 percent bromine, as compared with the theoretical value of 43.7 percent.

A 2 gram quantity of dibromo-di-p-xylylene prepared as above and 250 ml. of dry benzene were placed in a dry, three-necked flask equipped with a condenser which was protected from moisture with a drying tube, a magnetic stirred, a nitrogen-gas inlet and serum cap. The mixture was heated until a complete solution was obtained. About .5 gram of copper powder was added, followed by the addition of 30 ml. of n-butyl lithium solution (about 14–15% n-butyl lithium in hexane). The resulting mixture was heated to reflux under nitrogen atmosphere for an hour. After the reflux period, the mixture was cooled to about room temperature. About 30 ml. of dimethyl sulfate was added to the mixture with a syringe through the serum cap. An instant generation of heat was observed and the temperature of the mixture rose to about 75° C. The mixture was stirred for an extra 30 minutes and then about 250 ml. of water was added to the mixture with stirring. The benzene layer was separated from the aqueous layer, washed again with 250 ml. of water, filtered and then concentrated to dryness by heating to about 80° C. to recover as a solid, dimethyl di-p-xylylene. Traces of dimethyl sulfate were removed from the residual solid by drying the solid in high vacuum of about 0.05 mm. Hg at room temperature. The solid was then recrystallized from ethanol. The yield of the di-methyl di-p-xylylene which can be presented by the formula:

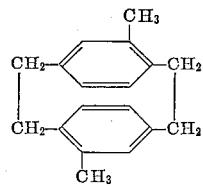

was about 90% of theoretical and its melting point about 182° C. to 183° C.

*Analysis.*—Calculated for $C_{18}H_{20}$: C, 91.52; H, 8.48. Found: C, 91.37; H, 8.50.

EXAMPLE II

*Diethyl di-p-xylylene*

Diethyl di-p-xylylene was prepared by the process of Example I except diethyl sulfate instead of dimethyl sulfate was employed. A small amount of methanol was used to remove the residual diethyl sulfate. Di-ethyl di-p-xylylene which can be represented by the formula:

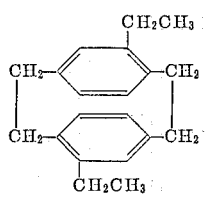

was obtained in about a 65% yield and was found to have a melting point of about 152° C. to 153° C.

*Analysis.*—Calculated for $C_{20}H_{24}$: C, 90.85; H, 9.09. Found: C, 90.27; H, 9.32.

What is claimed is:

1. Process for the preparation of alkylated di-p-xylylenes having the general formula:

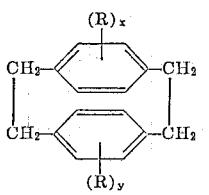

where R is an alkyl having from 1 to 8 carbon atoms and x and y are integers having a value from 1 to 3 inclusive, which comprises contacting a brominated di-p-xylylene having the structural formula:

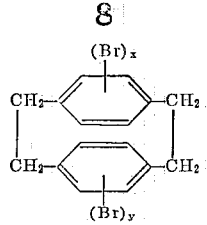

where x and y are integers having a value from 1 to 3, inclusive, with a lithium alkyl in the presence of an inert organic liquid solvent under anhydrous conditions and at a temperature between about 60° C. and 90° C., the lithium alkyl being used in amounts sufficient to replace all the bromine substituents thereon with the corresponding number of lithium atoms, and thereafter contacting the lithium substituted di-p-xylylene with a dialkyl sulfate to replace each lithium substituent with an alkyl group and form the corresponding alkylated di-p-xylylene.

2. Process according to claim 1 wherein dibromo di-p-xylylene is contacted with the lithium alkyl at temperatures between 60° C. and 90° C. to replace both bromine substituents thereon and thereafter contacting the lithium substituted di-p-xylylene with diakyl sulfate to form dialkyl di-p-xylylene.

3. Process according to claim 1 wherein dibromo di-p-xylylene is contacted with the lithium alkyl at temperatures between 60° C. and 90° C. to replace both bromine substituents thereon and thereafter contacting the lithium substituted di-p-xylylene with dimethyl sulfate to form dimethyl di-p-xylylene.

References Cited

UNITED STATES PATENTS

| | | | |
|---|---|---|---|
| 3,117,168 | 1/1964 | Gorham | 260—668 |
| 3,153,103 | 10/1964 | Yeh | 260—671 |
| 3,221,068 | 11/1965 | Gorham | 260—649 |

OTHER REFERENCES

Andersen, Dissertation Abstracts, vol. 20, pages 3949–50 (1960).

Fieser, Advanced Organic Chemistry, New York, Reinhold, 1961, pp. 781–783.

LEON ZITVER, *Primary Examiner.*

BERNARD HELFIN, *Examiner.*

N. J. KING, H. MARS, *Assistant Examiners.*